United States Patent
Ibrahim et al.

(10) Patent No.: US 10,003,829 B2
(45) Date of Patent: Jun. 19, 2018

(54) CONTROL MODULE UNIT FOR SERVICES SYSTEMS FOR A VEHICLE

(71) Applicant: The Boeing Company, Chicago, IL (US)

(72) Inventors: Yakentim M. Ibrahim, Brier, WA (US); Donald B. Lee, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 261 days.

(21) Appl. No.: 14/196,650

(22) Filed: Mar. 4, 2014

(65) Prior Publication Data

US 2015/0251759 A1    Sep. 10, 2015

(51) Int. Cl.
*H04N 21/214*   (2011.01)
*B64D 11/00*    (2006.01)
(Continued)

(52) U.S. Cl.
CPC ..... *H04N 21/2146* (2013.01); *B64D 11/0015* (2013.01); *B64D 45/00* (2013.01); *H02G 1/06* (2013.01); *H02G 3/281* (2013.01); *B64D 2011/0038* (2013.01); *B64D 2011/0053* (2013.01); *B64D 2045/007* (2013.01); *H01R 13/111* (2013.01); *H01R 25/162* (2013.01); *Y02T 50/46* (2013.01); *Y10T 29/49117* (2015.01)

(58) Field of Classification Search
CPC .................................................. H04N 21/2146
See application file for complete search history.

(56) References Cited

U.S. PATENT DOCUMENTS 7,597,286 B2    10/2009    Callahan et al.
7,676,225 B2 *  3/2010     Funderburk ....... B64D 11/0015
                                                    455/3.01
(Continued)

FOREIGN PATENT DOCUMENTS

EP    2803573 A2    11/2014
GB    2430118 A     6/2008

OTHER PUBLICATIONS

Combined Search and Examination Report, UK Intellectual Property Office, GB1503630.4 (dated Aug. 24, 2015).
(Continued)

*Primary Examiner* — Ricky Chin
(74) *Attorney, Agent, or Firm* — Walters & Wasylyna LLC (57) ABSTRACT

A cabin service system may include a control module unit, a pair of power rails, the power rails being configured to provide mechanical attachment and electrical power to the control module unit, and a plurality of cabin services, wherein the control module is communicatively coupled to the plurality of cabin services to provide control of the plurality of cabin services. The control module unit may include a plurality of communication ports, and a plurality of relays coupled to at least one communication port of the plurality of communication ports, wherein each communication port of the plurality of communication ports corresponds to at least one cabin service of the plurality of cabin services, and wherein each relay of the plurality of relays provides discrete control of an associated cabin service of the plurality of cabin services.

20 Claims, 10 Drawing Sheets

(51) Int. Cl.
*B64D 45/00* (2006.01)
*H02G 1/06* (2006.01)
*H02G 3/38* (2006.01)
*H01R 13/11* (2006.01)
*H01R 25/16* (2006.01)

(56) References Cited

U.S. PATENT DOCUMENTS

| | | | |
|---|---|---|---|
| 8,128,027 B2* | 3/2012 | Lee | H02J 1/08 244/118.5 |
| 8,166,506 B2 | 4/2012 | Callahan et al. | |
| 8,245,969 B2 | 8/2012 | Lee | |
| 2006/0179457 A1* | 8/2006 | Brady, Jr. | A63F 13/12 725/76 |
| 2007/0057121 A1* | 3/2007 | Callahan | H02G 3/32 244/118.5 |
| 2007/0057576 A1* | 3/2007 | Lee | H02J 1/08 307/9.1 |
| 2008/0189748 A1* | 8/2008 | Bleacher | H04N 7/17318 725/76 |
| 2008/0312778 A1* | 12/2008 | Correa | H04H 20/62 701/3 |
| 2009/0113494 A1* | 4/2009 | Weidel | B64D 45/0015 725/76 |
| 2010/0012780 A1* | 1/2010 | Kohlmeier-Beckmann | B60Q 3/0253 244/118.5 |
| 2011/0162015 A1* | 6/2011 | Holyoake | H04N 7/18 725/76 |
| 2012/0254923 A1* | 10/2012 | Riedel | B64D 11/0015 725/76 |
| 2014/0233959 A1* | 8/2014 | Ibrahim | G08C 23/04 398/106 |
| 2015/0094882 A1* | 4/2015 | Riedel | B64D 11/0015 701/3 |

OTHER PUBLICATIONS

Search Report issued by the Intellectual Property Office of Singapore, 10201501522S (2015).
Written Opinion Report, Singapore Intellectual Property Office, 10201501522S (dated Aug. 17, 2017).
Japanese Patent Office, Notification of Reasons for Rejection, JP2015-031824, (dated Feb. 20, 2018).
Japanese Patent Office, Notification of Reasons for Rejection-Translation, JP2015-031824, (dated Feb. 20, 2018).
Patent Office of the Cooperation Council for the Arab States of the Gulf, Examination Report GC 2015-29011, dated Dec. 24, 2017.

* cited by examiner

CONTROL MODULE UNIT FOR SERVICES SYSTEMS FOR A VEHICLE

FIELD

The present disclosure is generally related to vehicle system controls and, more particularly, to a control module unit for service systems for a vehicle.

BACKGROUND

Many commercial vehicles (e.g., aircraft) utilize a cabin services system to provide the vehicle with a number of services. Some of the cabin services address basic needs (e.g., of the crew and/or passengers), including cabin lighting, entertainment systems, passenger services (e.g., reading lights, air vents, attendant-calling functions), emergency oxygen, and signage (e.g., FASTEN SEAT BELTS and NO SMOKING). Other cabin services are designed to enhance the experience of the passenger, including in-flight entertainment such as music and video (with either flip-down or seatback screens) and Internet connectivity.

For example, conventional cabin service systems used in aircraft require miles of electrical wiring and cable. Not only is this wiring system complex, but it also adds substantial weight and cost to the aircraft and occupies valuable space. In addition to wiring complexity, the amount of skilled labor to perform the tedious and demanding installation and reconfiguration of the cabin services system is substantial.

Accordingly, those skilled in the art continue with research and development efforts in the field of vehicle service system controls.

SUMMARY

In one embodiment, the disclosed cabin service system may include a control module unit, a pair of power rails, the power rails being configured to provide mechanical attachment and electrical power to the control module unit, and a plurality of cabin services, wherein the control module is communicatively coupled to the plurality of cabin services to provide control of the plurality of cabin services.

In another embodiment, the disclosed control module unit may include a plurality of communication ports, and a plurality of relays coupled to at least one communication port of the plurality of communication ports, wherein each communication port of the plurality of communication ports corresponds to at least one cabin service of a plurality of cabin services, and wherein each relay of the plurality of relays provides discrete control of an associated cabin service of the plurality of cabin services.

In another embodiment, also disclosed is a method for installing a cabin service system in a vehicle, the method may include the steps of: (1) coupling a pair of power rails to a support structure of the vehicle, coupling a control module unit to the pair of power rails, the pair of power rails providing electrical power to and mechanical attachment of the control module unit, and (3) communicatively coupling the control module unit to a plurality of cabin services.

Other embodiments of the disclosed cabin service system and control module unit will become apparent from the following detailed description, the accompanying drawings and the appended claims.

DETAILED DESCRIPTION

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

The disclosed service system, control module unit and method are described in the context of cabin service systems of an aircraft; however, one of ordinary skill in the art will readily recognize the disclosed service system and control module may be utilized with a variety of different types of systems for a variety of different types of vehicles. For example, implementations of the embodiments described herein may be implemented in any type of vehicle including, e.g., helicopters, passenger ships, automobiles and the like. Therefore, the present disclosure is in no way meant to be limited to the disclosed embodiments.

Figure 1:
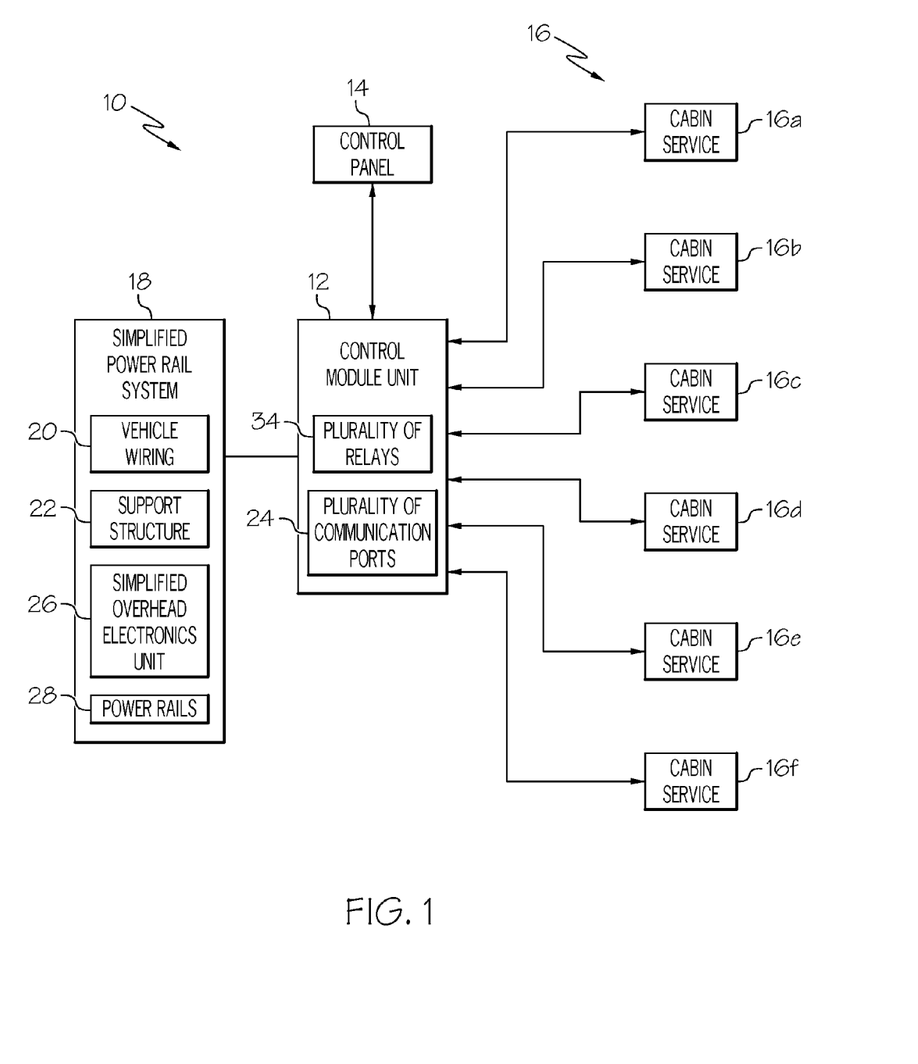
FIG. 1 is a block diagram of one embodiment of the disclosed cabin service system.

Referring to FIG. 1, one embodiment of the disclosed cabin service system, generally designated 10, may include may include a control module unit 12 communicatively connected to at least one control panel 14. For example, the control module unit 12 may be wired or wirelessly connected to the control panel 14. The control module unit 12 may be communicatively connected to one or more cabin services 16a, 16b, 16c, 16d, 16e, 16f (collectively identified as a plurality of cabin services 16). For example, the control module unit 12 may be wired or wirelessly connected to the plurality of cabin services 16.

The control module unit 12 may include a plurality of communication ports 24 and a plurality of relays 34. The control module unit 12 may provide control (e.g., discrete control) to one or more of the plurality of cabin services 16. The plurality of cabin services 16 may include any discrete electrical or electromechanical mechanism, device and/or system, such as those located within a cabin of an aircraft. For example, the plurality of cabin services 16 may include, but are not limited to, lights, motors, fans, latches, video panels, oxygen deployment unit (e.g., oxygen mask) and the like.

Control signals (e.g., input signals) from the control panel 14 may be transmitted (e.g., by wiring or wirelessly) to the control module unit 12. The control signals may be transmitted (e.g., by wiring or wirelessly) by the control module unit 12 to any of the connected plurality of cabin services 16. The control signals may control the functions of the plurality of cabin services 16 (e.g., turned on/off), such as general cabin lighting control, zonal cabin lighting control, zonal attendant call light control, door latch control, motor control of motorized systems (e.g., fans, window shades, and viewing screens), video panel control, oxygen deployment control, cabin climate control and many other functions related to the cabin service.

Additionally, data may be transmitted (e.g., communicated) to any of the plurality of cabin services 16. For example, data related to the functions of the plurality of cabin services 16 may be relayed from the control panel 14 to the plurality of cabin services 16 through the control module unit 12. For example, motorized systems may receive position data or video systems may receive video data (e.g., content for display).

Similarly, data may be transmitted (e.g., communicated) from the plurality of cabin services 16 back to the control panel 14 through the control module unit 12. For example, data related to the functions of the plurality of cabin services 16 may be relayed between cabin services 16 and/or to the control panel 14 through the control module unit 12. The data may provide information related to the condition of any of the plurality of cabin services 16 (e.g., on/off condition, position of motorized systems, locked/unlocked condition and cabin climate condition) back to the control panel 14.

Thus, the disclosed cabin service system 10 may be greatly simplified, cabin service controls may be more easily interfaced, and each control module unit 12 and cabin service 16*a*, 16*b*, 16*c*, 16*d*, 16*e*, 16*f* may be quickly installed, configured and maintained without additional wiring or hookups. Taken together, these interfaces may allow for the elimination of several existing components of conventional cabin service systems and excessive wiring associated with those components leading to a significantly smaller and lighter footprint.

The control panel 14 (e.g., a cabin attendant panel) may be used to transmit the control signals via one or more control switches (e.g., buttons) (not shown) directly to one or more (e.g., groups) of the plurality of cabin services 16. For example, the control panel 14 may provide for functions such as turning on/off passenger signage (e.g., "No Smoking" and "Fasten Seat Belt"), turning on/off cabin lighting, turning on/off video displays (e.g., in-flight entertainment systems), opening/closing window shades, extending/retracting projection screens or resetting passenger service units (e.g., turning off reading lights, personal air outlets, and flight attendant call lights; and turning on "No Smoking" and "Fasten Seat Belt" signs), such as during gate turnaround between flights. The control panel 14 may also include a display (not shown) for displaying data, such as the condition of the plurality of cabin services 16.

The control module unit 12 may be utilized in conjunction with a simplified power rail system 18 within an aircraft for providing power to the control module unit 12. The simplified power rail system 18 may include vehicle wiring 20 (e.g., aircraft wiring), a support structure 22, a simplified overhead electronics unit 26, and at least one power rail 28 (e.g., a pair of spaced apart power rails 28).

The vehicle wiring 20 may include four wires including two non-essential power wires (e.g., 115 VAC and current return) and two essential power wires (e.g., 28 VDC and current return). The support structure 22 may include any interior monument, such as a ceiling (e.g., of a purser workstation, a crew rest area, a galley or a lavatory). The support structure 22 may include a support assembly that supports removable panels 30 (FIG. 2), the power rails 28 and other equipment.

The control module unit 12 may utilize the simplified power rail system 18 to allow it to easily snap onto the power rails 28 without additional wires. The powered rails 28 may provide both a structural interface for installing one or more control module units 12 as well as an electrical power interface. For example, each control module unit 12 may simply snap onto the power rails 28 for both mechanical attachment and for electrical power.

The simplified overhead electronics unit 26 may performs three functions: (1) converting power inputs into a "safe-to-touch" power output (e.g., 12V DC), (2) switching the outputs from being powered by the non-essential power input to being powered by the essential power input whenever the essential power bus becomes live, and (3) reversing the polarity of the outputs when the essential power bus becomes live. The simplified overhead electronics unit 26 may perform its functions while maintaining circuit separation between the non-essential and the essential power busses at all times.

This leaves electrical power as the electrical interface to each control module unit 12 via the power rails 28 and also provides a means for powering non-essential or essential loads on the power rails 28. In an example implementation, the power rails 28 may be energized with electricity such that when a control module unit 12 is clipped to the power rails 28, electrical contact is also made between the control module unit 12 and the power rails to provide electrical energy to the control module unit 12.

In an example construction, the power rails 28 may be accessed by removing one or more of the removable panels 30 (FIG. 2) of the support structure 22. The power rails 28 may be approximately the same length as the underlying support structure 22. The control module unit 12 may be connected (both mechanically and electrically) to the power rails 28 in place of the panel 30.

Figure 2:
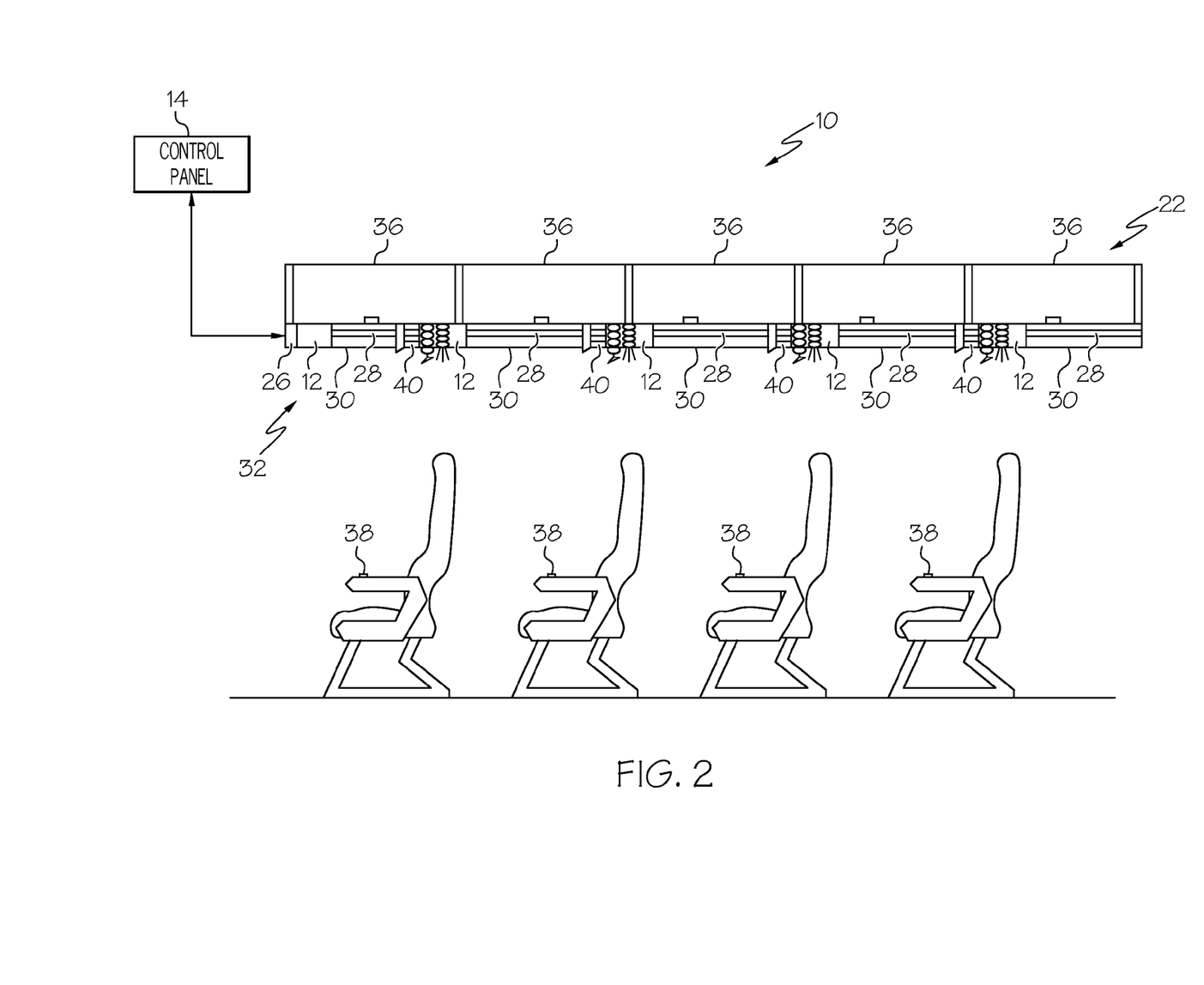
FIG. 2 is a schematic illustration of one implementation of the disclosed cabin service system.

Referring to FIG. 2, as a specific, non-limiting example construction, the support structure 22 may be an overhead stow bin assembly 32. A typical stow bin assembly 32 (e.g., located above a seat group 38 on a commercial aircraft) may include one or more stow bins 36, one or more removable panels 30, the power rails 28, one or more passenger service units 40 and other equipment. The power rails 28 may have a length approximately the same as the stow bin assembly 32.

Each passenger service unit 40 may be one of the plurality of cabin services 16. The passenger service unit 40 may come in many forms. Any given passenger service unit 40 may include one or more of the following functionalities: flight attendant call light, reading light, personal air outlets, emergency oxygen, in-flight entertainment system control (e.g., video or audio channel selection), cabin signage (e.g., "fasten seat belt", "no smoking") or other passenger services. Those skilled in the art will recognize that a variety of other functions may be included in the passenger service unit 40 and their use would be within the spirit and scope of the present disclosure.

In an example implementation, each passenger service unit 40 may utilize the simplified power rail system 18 to allow it to easily snap onto the power rails 28 without additional wires, duct or tube hookups. The powered rails 28 may provide both a structural interface for installing a passenger service unit 40 as well as an electrical power interface. For example, each passenger service unit 40 may simply snap onto the power rails 28 for both mechanical attachment and for electrical power.

Figure 3:
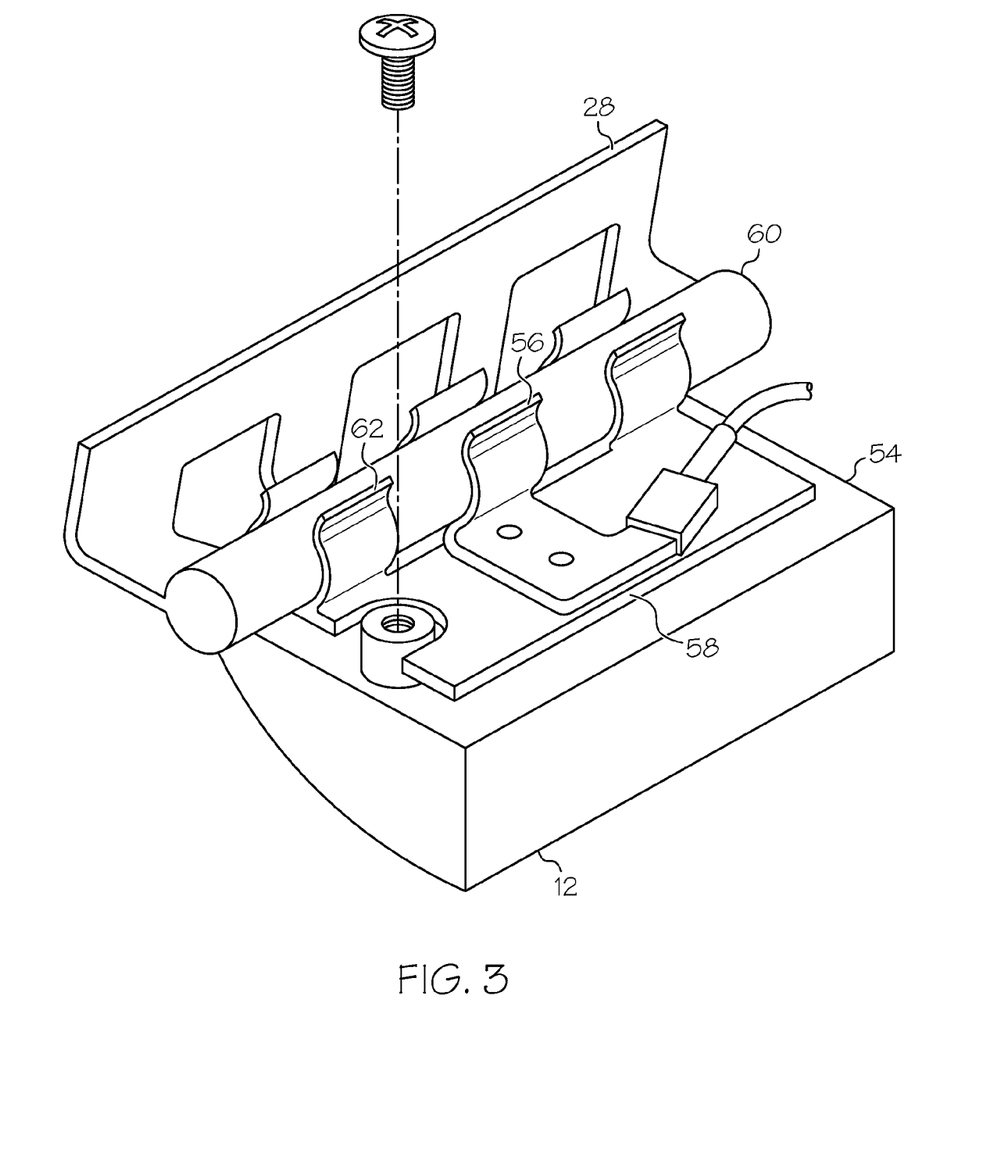
FIG. 3 is a perspective view of a portion of one embodiment of the control module unit of the disclosed cabin service system.

Referring to FIG. 3, illustrating an example construction of a portion of the control module unit 12. Each power rail 28 may include one or more electrically conductive portions having a shape suitable for mechanical connection of the control module unit 12. The portion (e.g., edge) of the power rail 28 that control module unit 12 connects may be kept electrically conductive (e.g., an electrically conductive portion 60).

In an example construction, the power rails 28 may be constructed from an aluminum extrusion. While most surfaces of the power rail 28 may typically be primed and painted, the aluminum power rail 28 along this electrically conductive portion may be plated, for example, with nickel and gold to provide electrical conduction.

For example, each power rail 28 may include a round electrically conductive portion 60, to which the control module unit 12 may be mechanically and electrically connected. The control module unit 12 may include an electrical contact assembly 54 configured to be connected to the electrically conductive portion of the power rails 28.

In an example construction, the electrical contact assembly 54 may include at least one electrical spring contact 56 and a plastic, non-conductive, insulating support 58. For example, the electrical contact assembly 54 may include at one pair of opposed electrical spring contacts 56 and an insulating supports 58. In an example construction, the electrical spring contact 56 may be made of beryllium copper that is nickel and gold plated. The electrical spring contact 56 may be designed to clip onto the round electrically conductive portion 60 of the power rails 28. The plastic support 58 may be designed to connect to the power rail 28 and may be intended to support the electrical spring contact 56 and to prevent the electrical spring contact 56 from rocking back and forth on the power rail 28. For example, the plastic support 58 may include one or more non-conductive spring clips 62 configured to clip onto the round electrically conductive portion 60 of the power rail 28.

The electrical contact assembly 54 may be loosely fastened to a control module unit 12 such that when a control module unit 12 vibrates under the power rails 28, the electrical spring contact 56 will float over the control module unit 12 and maintain its grip on the power rails 28. With these elements in place, the electrical spring contact 56 may mate with the electrically conductive portion 60 of the power rail 28 when the control module unit 12 is installed (e.g., mechanically and electrically connected).

Accordingly, each control module unit 12 utilized in the disclosed cabin service system 10 may receive electrical power from the power rails 28, for example via electrical spring contacts 56.

Figure 4:
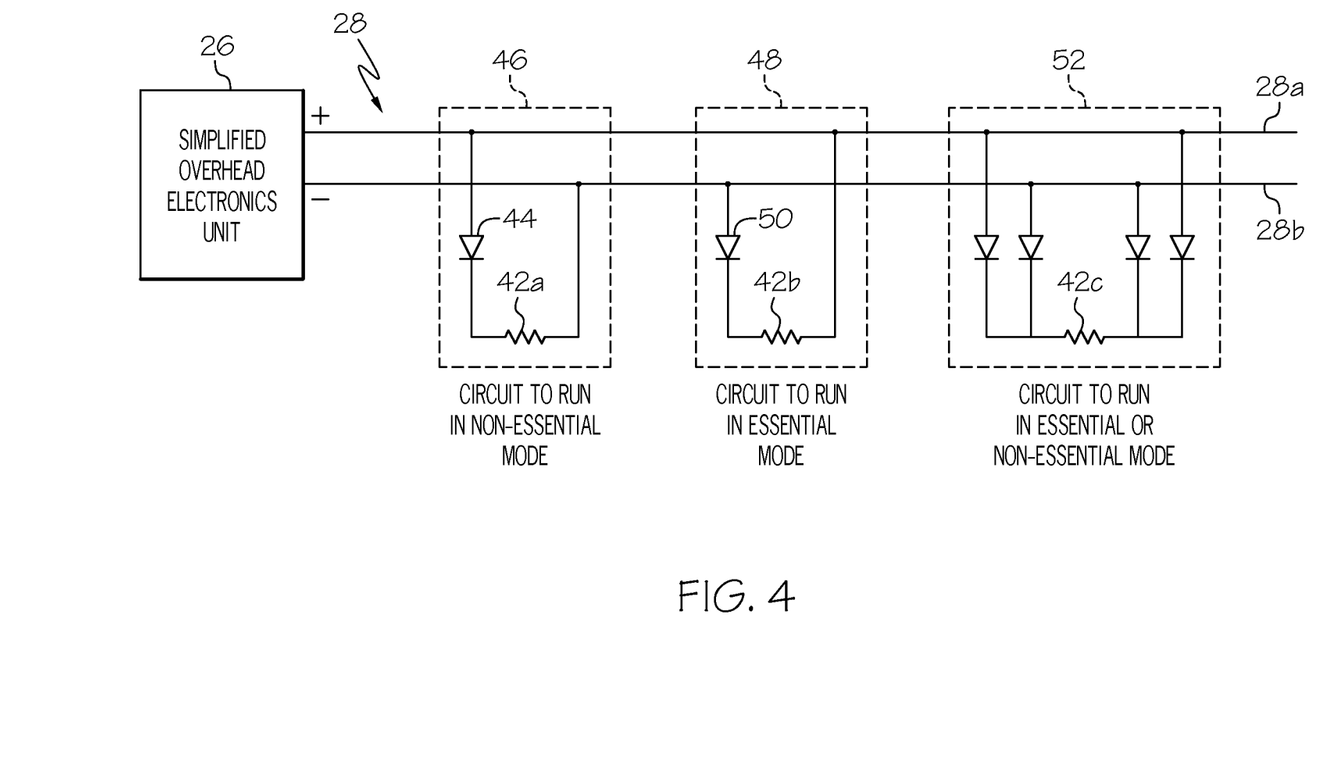
FIG. 4 is a schematic illustration of the operation of the power rails of the disclosed cabin service system with circuits connected thereto.

Referring to FIG. 4, illustrating the operation of the power rails 28 with control module unit circuits as indicated by loads 42a, 42b and 42c connected thereto. As is seen, under normal operating conditions, a diode 44 in series with each control module unit 12 circuit allows current to flow through non-essential circuits 46. Non-essential circuits are, for example, circuits for cabin lighting, flight attendant call lights, in-flight entertainment monitors or the like. For essential circuits 48, such as one for oxygen deployment, a diode 50 in series prevents current from flowing into the circuit. Thus, under non-normal operating conditions, such as during emergency oxygen deployment, the output of the simplified overhead electronics unit 26 may revert from a non-essential power mode to an essential power mode and the output polarity may be reversed. Thus, the diode 44 on the non-essential circuits prevent current to flow through them while the diode 50 on the essential circuits now allow current to flow through them. This can be used, for example, to momentarily power a solenoid that opens an oxygen mask door thus allowing oxygen masks to fall into the cabin, or, for example, to continuously power a wirelessly activated oxygen system.

If a circuit 52 requires power during both normal and non-normal conditions, diodes may be used to provide power to the circuit 52 under either condition. If the circuit 52 could operate with either polarity, no diodes would be necessary and the circuit may be connected to each of the rails.

In an example implementation, the 12V DC power rail contact and the current return contact may be widely spaced. In this implementation, such a design may help to prevent accidental shorting across the contacts (e.g., with a conductive tool that might otherwise startle a mechanic by discharging sparks). Additionally, all portions of the power rails 28 that are not contacted by the electrical contact of the control module unit 12 (or the passenger service unit 40 or other cabin services 16) may be made from non-conductive materials or finished with non-conductive finishes as another preventive measure against accidental shorting.

The power rails 28 may implement any low voltage power type, AC or DC. Those skilled in the art will recognize that power rail designs other than that shown in FIG. 3 may be feasible. For example, a male spring contact may be moved to the control module unit 12 with a female contact inserted into a groove in an arm of the power rails 28. In this case, both the 12V DC and return rails may be located on the same side of the control module unit 12 (instead of opposite sides) since both power rail contacts may be recessed protecting them from accidental shorting (e.g., with a conductive tool).

In an example embodiment, each power rail 28 may be electrically connected to one of the outputs from the simplified overhead electronics unit 26, for example, via a wire. In an example implementation, the simplified overhead electronics unit 26 may energize the power rails 28 with 12 VDC voltage. Thus, one power rail 28a (FIG. 4) may be connected to the normally positive DC output and the other power rail 28b (FIG. 4) may be connected to the normally negative DC output.

Figure 5:
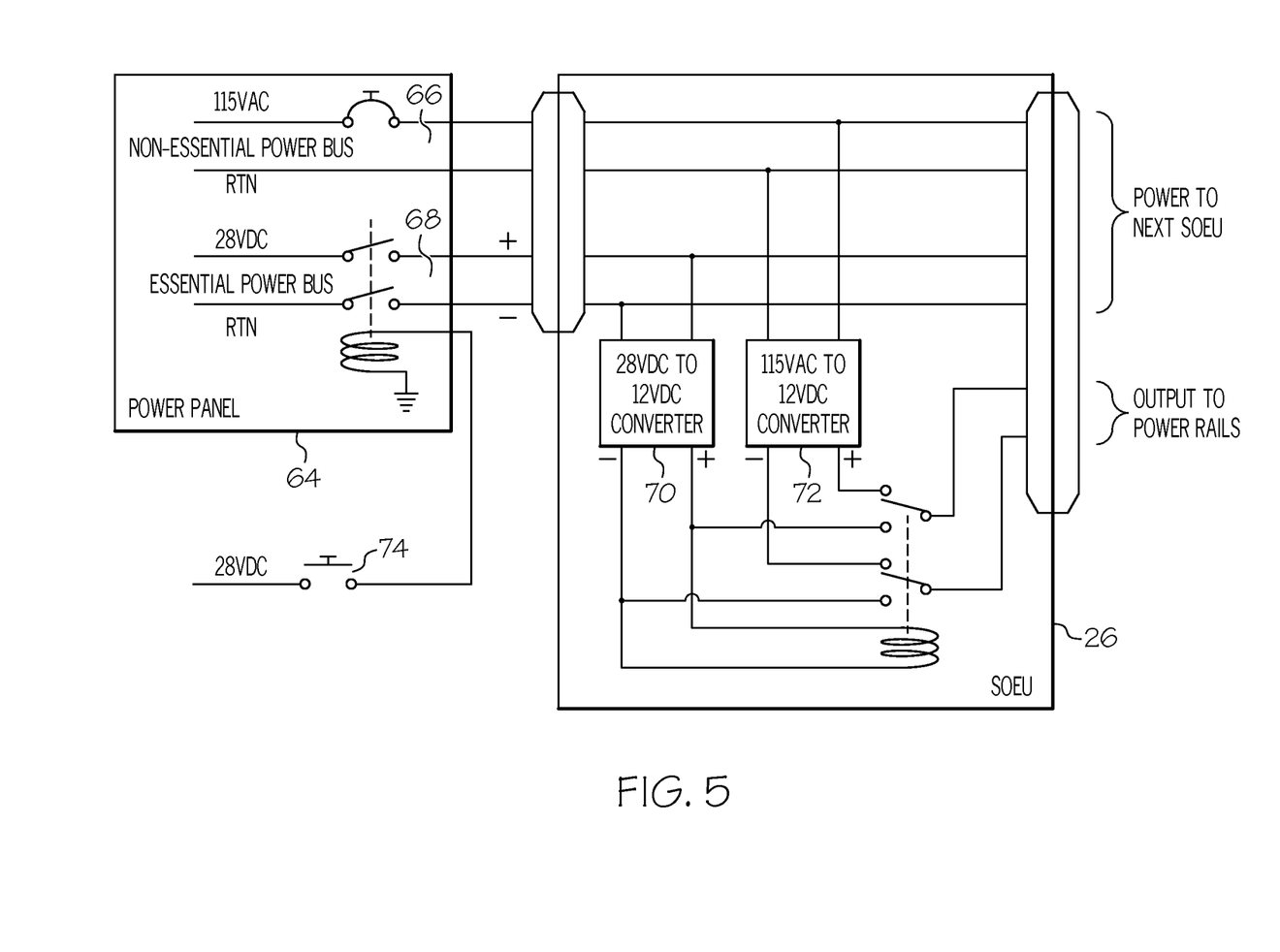
FIG. 5 is a schematic illustration of one embodiment of the simplified overhead electronics unit of the disclosed cabin service system.

Referring to FIG. 5, in an example embodiment, a power panel 64 may provide power to the simplified overhead electronics unit 26 via a non-essential power bus 66 and/or an essential power bus 68. The simplified overhead electronics unit 26 may include a first converter 70 for converting the essential voltage to a usable voltage and a second converter 72 for converting the non-essential voltage to a usable voltage.

In this example the non-essential power bus 66 may be 115 VAC and may be transformed to 12 VDC by the second converter 72 (e.g., an AC-to-DC converter) within the simplified overhead electronics unit 26. The non-essential power bus 66 may also be turned off without turning on the essential power bus 68 by opening a circuit breaker or relay (e.g., located in the power panel 64).

The essential power bus 68 may be 28 VDC and may be converted to 12 VDC by the first converter 70 (e.g., a DC-to-DC converter) within the simplified overhead electronics unit 26. The essential power bus 68 may typically be turned on via a relay (e.g., located in the power panel 64). For example, the relay may be activated by a switch 74 in the vehicle. As a specific, non-limiting example, the relay may be activated by a switch 74 in the flight deck of an aircraft, such as for emergency oxygen deployment.

The power buses 66, 68 may be fed through the simplified overhead electronics unit 26 for installation convenience. This may allow several simplified overhead electronic units 26 (SOEU) to be daisy chained together (e.g., down the aircraft).

Figure 6:
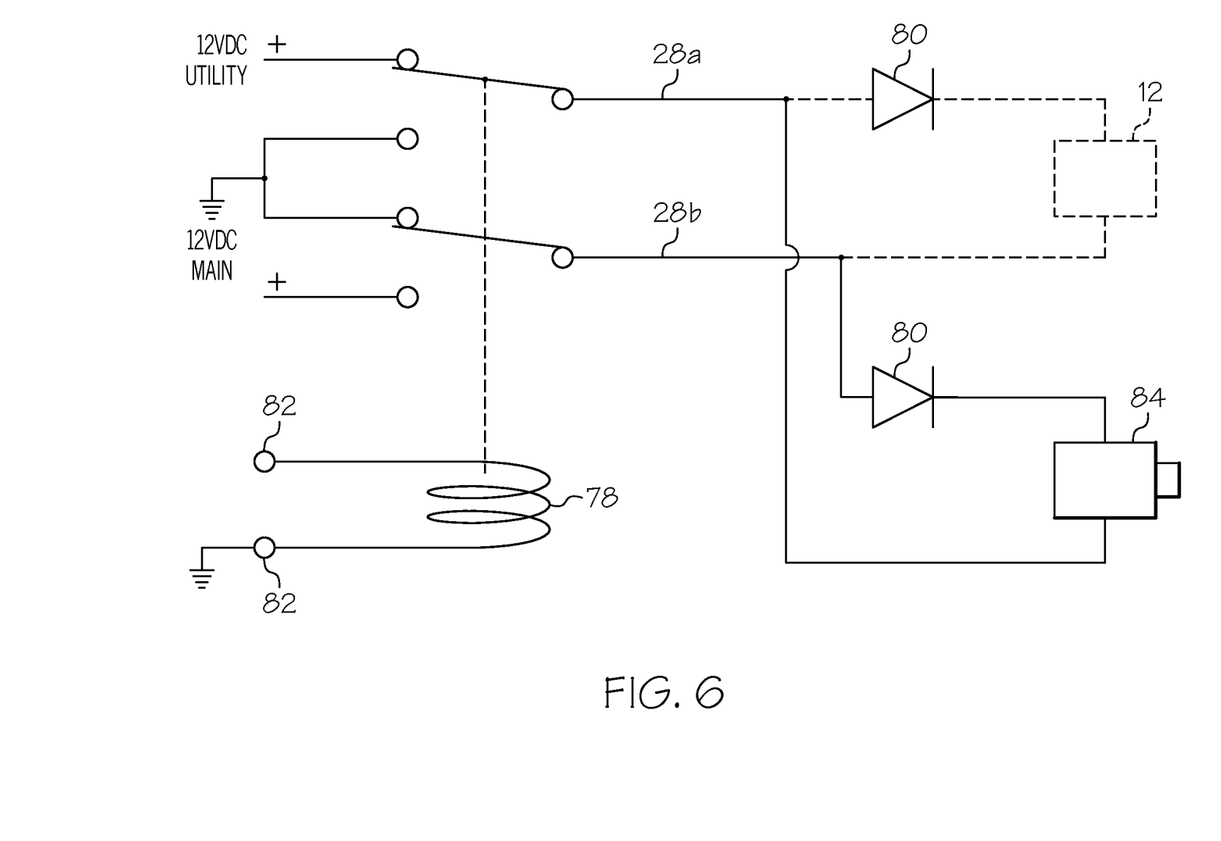
FIG. 6 is a schematic illustration of another embodiment of the disclosed cabin service system.

Those skilled in the art will recognize that there are several ways to accomplish the functionality of the simplified overhead electronics unit 26 and the example circuit shown in FIG. 6 is just one way to implement this function.

In an example construction, the simplified overhead electronics unit 26 may be mounted to the support structure 22 (FIG. 1), such as on the stow bin assembly 32 (FIG. 2). In this example, only power from the inputs of the non-essential power bus 66 may be used to create the 12 VDC output under normal operating conditions (e.g., when the essential power bus 68 is not live). When the essential power bus 68 becomes live, a relay may be energized to switch the output from being driven by the non-essential power bus 66 to being driven by the essential power bus 68 input, such that the output polarity will be reversed relative to the normal operating condition when this occurs.

Accordingly, the power rails 28 may perform two functions: (1) mechanical support of the control module unit 12, the passenger service unit 40 and/or another cabin service 16, and (2) electrical supply to the control module unit 12, the passenger service unit 40 and/or another cabin service 16.

This may minimize the addition of new components or weight to the vehicle (e.g., an aircraft). However, because of this dual functionality, electrical isolation may be required between the power rail 28 and any adjacent conductive parts of the vehicle. Thus, plastic bushings (not shown) may be used at the power rail 28 mounting points.

When combined with control infrastructure (e.g., control signal and data transmission), the power rails 28 may greatly simplify installation of the control module unit 12 by providing electrical power one or more control module units 12 via the power rails 28 instead of through electrical wiring. With fewer data or power wiring interfaces, control module units 12 may be able to be installed, removed or relocated much more rapidly.

Referring to FIG. 6, in an example embodiment, one of the plurality of cabin services 16 may include an oxygen passenger service unit (not shown). The cabin service system 10 may utilize a relay 78 (e.g., either a mechanical relay or a solid-state relay). Since the control module unit 12 may share the power rails 28a, 28b with an oxygen passenger service unit, each control module unit 12 may be protected by a diode 80 to prevent power from being applied to the control module unit 12 while oxygen may be deployed.

In this embodiment, the power rails 28a, 28b may also double as oxygen mask deploy wiring. The oxygen deploy discrete output 82 may be tied to the relay 78. When oxygen is commanded, the relay 78 may be energized and 12 VDC power from the primary bus (e.g., essential power bus 68) may be routed to the power rails 28a, 28b in reverse polarity causing an oxygen passenger service unit door solenoid 84 to be energized causing the oxygen masks (not shown) to deploy. The diode 80 may keep the power to any of the plurality of cabin services 16 operating on the non-essential power bus 66 (FIG. 6) off until utility bus power is restored and the oxygen deploy discrete output 82 is returned to its normal state.

Figure 7:
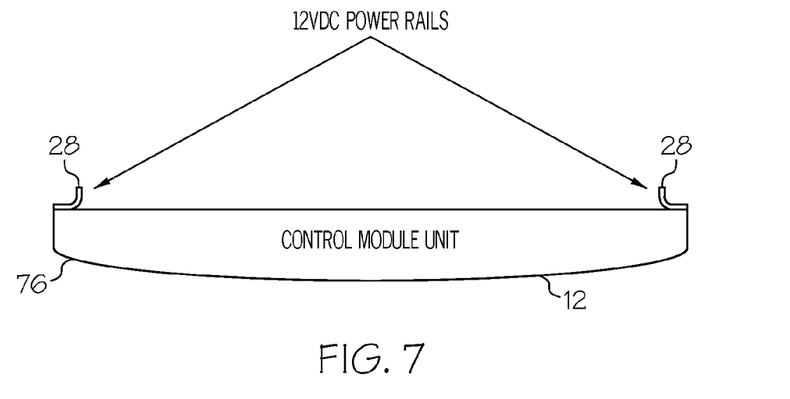
FIG. 7 is a schematic illustration of one embodiment of the control module unit.

Referring to FIG. 7, in an example construction, the control module unit 12 may include an exterior housing 76.

The control module unit 12 may be mounted on the power rails 28. For example, the power rails 28 may be incorporated within the support structure 22 (e.g., the stow bin assembly 32) (FIG. 2). The power rails 28 may provide power to the control module unit 12. The housing 76 may include the electrical contact assembly 54, the electrical spring contact 56, the insulating support 58 and the non-conductive spring clips 62, as illustrated in FIG. 3. Current limiting and short circuit protection may be provided by a control module unit power supply (not shown).

In an example implementation of the disclosed cabin service system 10, the control module unit 12 may be take the place of an unused (e.g., blank) panel 30 of the support structure 22 (e.g., a blank panel 30 of the stow bin assembly 32) (FIG. 2) to provide installation flexibility for control of the plurality of cabin services 16 (e.g., lighting control).

Figure 8:
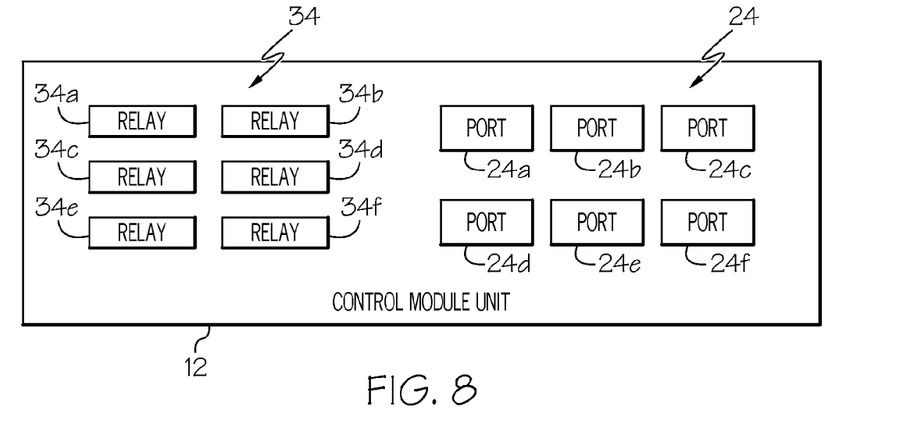
FIG. 8 is a block diagram of one embodiment of the control module unit.

Referring to FIG. 8, in an example embodiment, the control module unit 12 may include the plurality of communication ports 24 (identified individually as port 24a, 24b, 24c, 24d, 24e, 24f) and the plurality of relays 34 (Identified individually as relay 34a, 34b, 34c, 34d, 34e, 34f). Each of the plurality of communications ports 24 may be communicatively connected to one or more control panels 14. Each of the plurality of communications ports 24 may be configured to receive and/or transmit control signals and/or data, for example to and/or from the control panel 14. Each port 24a, 24b, 24c, 24d, 24e, 24f may be a uni-directional port or a bi-directional port. For example, one or more of the plurality of communication ports 24 may be an infrared (IR) port, an Ethernet port (e.g., a 10/100 Base T Ethernet port), a controller area network (CAN) bus port, an RS-485 port and/or combinations thereof. One or more of the plurality of communication ports 24 may be of the same or different types.

While six ports 24a, 24b, 24c, 24d, 24e, 24f are shown by example, those skilled in the art will recognize that the plurality of communication ports 24 may include any appropriate number of ports depending upon a specific implementation of the control module unit 12. Not every port 24a, 24b, 24c, 24d, 24e, 24f of the plurality of communication ports 24 may be utilized in every implementation of the control module unit 12.

Each relay 34a, 34b, 34c, 34d, 34e, 34f may include an electronic switching device, such as a solid-state relay, a field effect transistor (FET) or similar non-mechanical switch for discrete control of the plurality of cabin services 16.

While six relays 34a, 34b, 34c, 34d, 34e, 34f are shown by example, those skilled in the art will recognize that the plurality of relays 34 may include any appropriate number of relays depending upon a specific implementation of the control module unit 12. For example, the control module unit 12 may include 20 or more relays.

Figure 9:
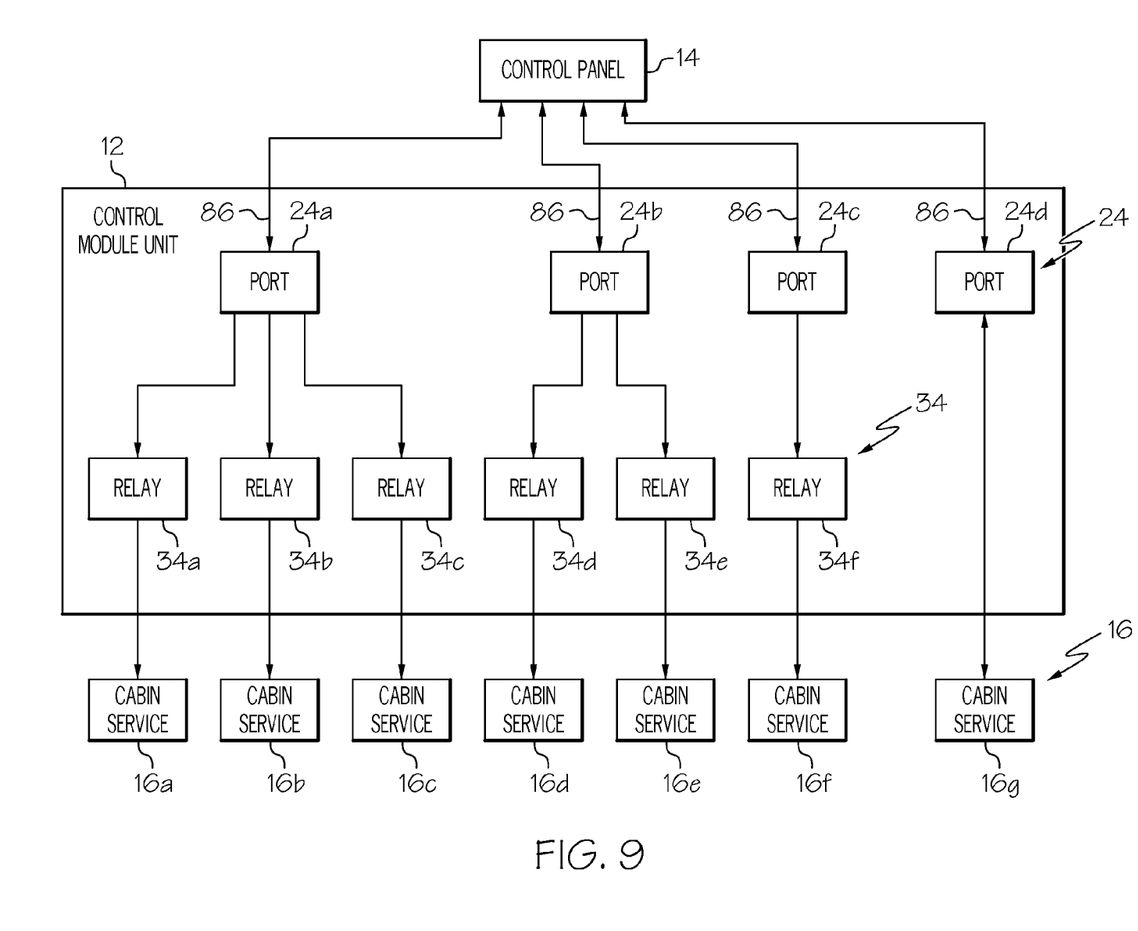
FIG. 9 is a block diagram of one implementation of the control module unit.

Referring to FIG. 9, the control module unit 12 may provide analog control via the plurality of relays 34 for the discrete control of cabin services 16 (e.g., lighting) and may host a variety of digital interfaces (e.g., Ethernet, RS-485 and/or CAN busses) to provide control and communication to other cabin services 16 (e.g., stand-alone services).

An input signal (e.g., control signal, command information and/or data) may be transmitted from the control panel 14 to the control module unit 12 via one or more communicative connections 86 (e.g., wired or wireless connections). For example, the communicative connections 86 may include an IR connection, an Ethernet connection, a CAN connection or an RS-485 connection. Each communicative connection 86 may be communicatively connected to one of the plurality of communication ports 24 (e.g., port 24a, 24b, 24c).

In an example implementation, the control module unit 12 may include a plurality of communication ports 24. A plurality of relays 34 may be coupled to at least one communication port of said plurality of communication ports 24. Each communication port of the plurality of communication ports 24 may correspond to at least one cabin service of the plurality of cabin services 16. Each relay of the plurality of relays 34 may provide for discrete control of an associated cabin service of the plurality of cabin services 16. At least one communication port of the plurality of communication ports 24 may be coupled to an associated cabin service of the plurality of cabin services 16 to transmit data to and/or receive data from the associated cabin service.

For example and as illustrated in FIG. 9, each port 24a, 24b, 24c may be electrically connected to one or more relays of the plurality of relays 34. Port 24a may correspond to cabin services 16a, 16b, 16c. Port 24a may be connected to relays 34a, 34b and 34c for discrete control of associated cabin services 16a, 16b and 16c. Port 24b may correspond to cabin services 16d, 16e. Port 24b may be connected to relays 34d and 34e for discrete control of associated cabin services 16d and 16e. Port 24c may correspond to cabin service 16f. Port 24c may be connected to relay 34f for discrete control of associated cabin service 16f. Port 24d may correspond to cabin service 16g. Port 24d may be communicatively connected to associated cabin service 16g for control and/or other digital communication between the cabin service 16g and the control panel 14.

Figure 10:
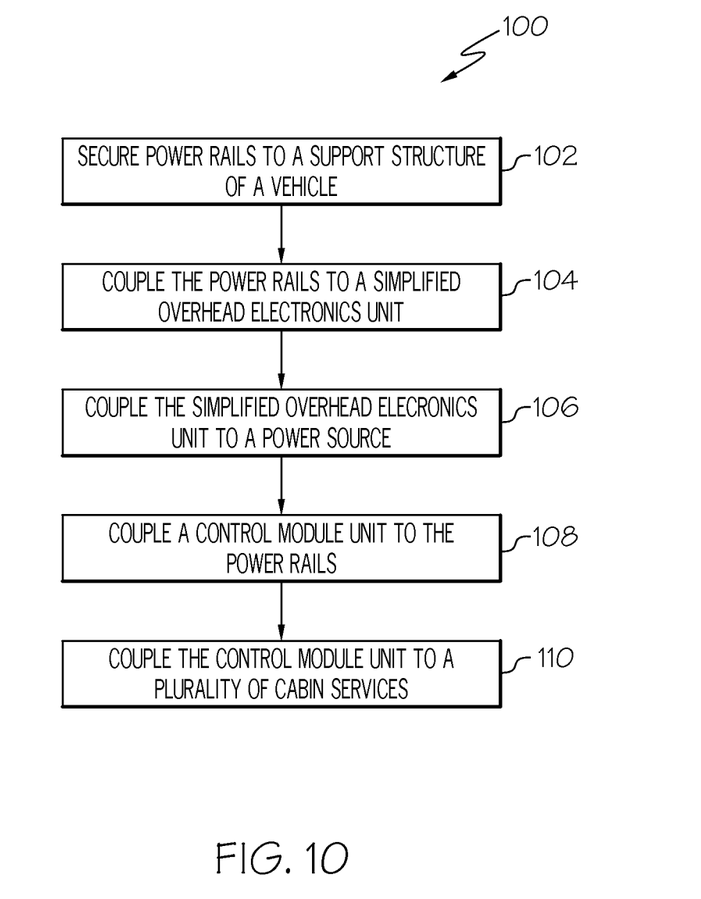
FIG. 10 is a flow diagram of one embodiment of the disclosed method for installing a cabin service system in a vehicle.

Those skilled in the art will recognize that there are many configurations of the plurality of relays 34 relative to the plurality of communication ports 24 to accomplish the functionality of the control module unit 12 and the example configuration shown in FIG. 10 is just one way to implement this function.

Referring to FIG. 10, one embodiment of the disclosed method, generally designated 100, for installing a cabin service system in a vehicle may begin at block 102 by coupling (e.g., securing) power rails (e.g., a pair of power rails) to a support structure of the vehicle.

As shown at block 104, power rails may be coupled to a simplified overhead electronics unit.

As shown at block 106, the simplified overhead electronics unit may be coupled to a power source via a non-essential power bus and an essential power bus. The simplified overhead electronics unit may provide power output to the power rails.

As shown at block 108, a control module unit may be coupled to the power rails. For example, the control module unit may include an electrical contact and one or more non-conductive clips that detachably clip to the power rails to provide both electrical connection and a mechanical connection of the control module unit to the power rails.

A first electrical circuit may be coupled to the power rails and the simplified overhead electronics unit to provide power for operation of essential functions while electrically connected to the power rails.

A second electrical circuit may be coupled to the power rails and the simplified overhead electronics unit to provide power for operation of non-essential functions while electrically connected to the power rails. The first electrical circuit and the second electrical circuit may operate alternately based upon a polarity of the power of the power rails.

As shown at block 110, one or more cabin services may be coupled to the control module unit for discrete control of the cabin services.

Accordingly, systems and methods in accordance with the disclosed embodiments may streamline the process for installation and removal of one or more control module units over conventional cabin control units. The disclosed control module unit may be utilized in conjunction with a power rail system within an aircraft for providing discrete control to various cabin service systems and that may be easily installed and removed.

Figure 11:
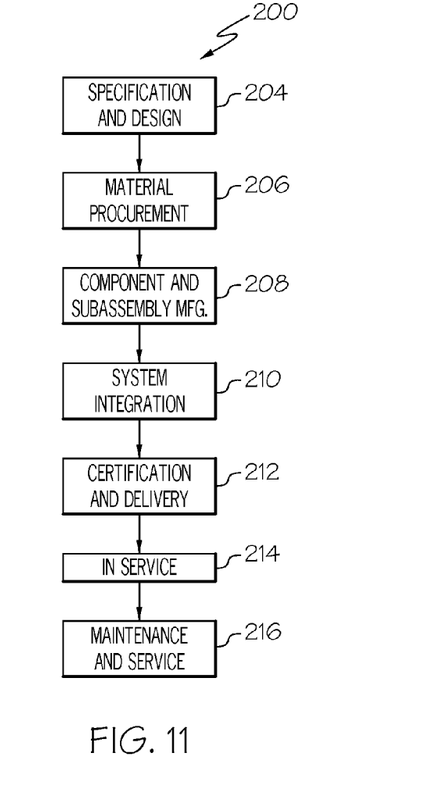
FIG. 11 is flow diagram of an aircraft production and service methodology.
Figure 12:
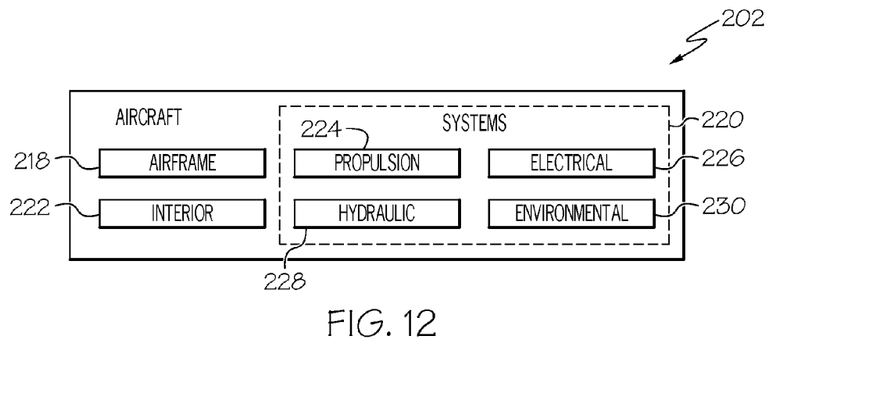
FIG. 12 is a block diagram of an aircraft.

Examples of the disclosure may be described in the context of an aircraft manufacturing and service method 200, as shown in FIG. 11, and an aircraft 202, as shown in FIG. 12. During pre-production, the aircraft manufacturing and service method 200 may include specification and design 204 of the aircraft 202 and material procurement 206. During production, component/subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216, which may also include modification, reconfiguration, refurbishment and the like.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 202 produced by example method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included. Although an aerospace example is shown, the principles of the disclosed cabin service system 10, control module unit 12 and method 100 may be applied to other industries.

Apparatus and methods embodied herein may be employed during any one or more of the stages of the production and service method 200. For example, components or subassemblies corresponding to component/subassembly manufacturing 208, system integration 210, and or maintenance and service 216 may be fabricated or manufactured using the disclosed cabin service system 10, control module unit 12 and method 100. Also, one or more apparatus examples, method examples, or a combination thereof may be utilized during component/subassembly manufacturing 208 and/or system integration 210, for example, by substantially expediting assembly of or reducing the cost and weight of an aircraft 202, such as electrical system 226, environmental system 230 and/or the interior 222. Similarly, one or more of apparatus examples, method examples, or a combination thereof may be utilized while the aircraft 202 is in service, for example and without limitation, to maintenance and service 216 (e.g., reconfiguration of the interior 222).

Although various embodiments of the disclosed systems and methods have been shown and described, modifications may occur to those skilled in the art upon reading the specification. The present application includes such modifications and is limited only by the scope of the claims.

What is claimed is:

1. A cabin service system comprising:
a cabin control panel configured to transmit and receive passenger service control signals, passenger service data, cabin service control signals and cabin service data;
a pair of power rails;
a control module unit mechanically and electrically coupled to said power rails, wherein said control module unit is located separate from and is communicatively coupled with said cabin control panel, said control module unit comprising:
a plurality of communication ports comprising:
at least one infrared communication port;
at least one 10/100 Ethernet communication port;
at least one Controller Area Network communication port; and
at least one RS-485 communication port; and
a plurality of relays communicatively coupled to each communication port of said plurality of communication ports;
a plurality of passenger service units mechanically and electrically coupled to said power rails, wherein each of said plurality of passenger service units is located separate from said control module unit and is communicatively coupled to first ones of said plurality of relays of said control module unit;
a plurality of passenger service elements communicatively coupled to said plurality of plurality of passenger service units, wherein each of said plurality of passenger service elements is configured to provide a passenger related service associated with a seat group; and
a plurality of cabin service elements located separate from said control module unit and said plurality of passenger service units, wherein each of said plurality of cabin service elements is communicatively coupled to second ones of said plurality of relays of said control module unit and is configured to provide a stand-alone non-passenger related service unassociated with said seat group; and wherein:
said control module unit is removable from said pair of power rails by decoupling the control module unit from already existing electrical contacts in the power rails, and is movable relative to said pair of power rails to selectively locate said control module unit anywhere along said pair of power rails relative to any one of said cabin control panel, said plurality of passenger service units, and said plurality of cabin service elements by coupling the control module unit to already existing electrical contacts in the power rails without additional wires;
said control module unit relays said passenger service control signals and said passenger service data between said cabin control panel and said plurality of passenger service units; and
said control module unit relays said cabin service control signals and said cabin service data between said cabin control panel and said plurality of cabin service elements.

2. The cabin service system of claim 1 wherein each communication port of said plurality of communication ports is communicatively coupled to and corresponds to one or more cabin service elements of said plurality of cabin service elements or one or more passenger service units of said plurality of passenger service units.

3. The cabin service system of claim 1 wherein said control module unit comprises:
at least one electrical spring contact detachably connected to at least one power rail of said pair of power rails to provide electrical power said control module unit; and
at least one non-conductive spring clip detachably connected to said at least one power rail to provide mechanical attachment of said control module unit to said at least one power rail.

4. The cabin service system of claim 1 wherein said cabin control panel at least one of transmits said passenger service control signals and said cabin service control signals to said control module unit, transmits said passenger service data and said cabin service data to said control module and receives said passenger service data and said cabin service data from said control module unit.

5. The cabin service system of claim 1 comprising:
a power source; and
a simplified overhead electronics unit coupled to the power source via a non-essential power bus and an essential power bus,
wherein said simplified overhead electronics unit provides a power output to said pair of power rails.

6. The cabin service system of claim 5 wherein said simplified overhead electronics unit comprises:
a first converter to convert power on said non-essential power bus from 115V AC to 12V DC;
a second converter to convert power on said essential power bus from 28V DC to 12V DC; and
a relay to switch said power output from said non-essential power bus to said essential power bus when said essential power bus is energized.

7. The cabin service system of claim 5 comprising:
a first electrical circuit coupled to said pair of power rails and said simplified overhead electronics unit to provide power for operation of essential functions while electrically connected to said pair of power rails; and
a second electrical circuit coupled to said pair of power rails and said simplified overhead electronics unit to provide power for operation of non-essential functions while electrically connected to said pair of power rails.

8. The cabin service system of claim 1 wherein said plurality of cabin service elements comprises at least one of a general cabin lighting unit, a zonal cabin lighting unit, an electromechanical latch, a motorized fan, a motorized window shade, a motorized viewing screen, and a video panel.

9. The cabin service system of claim 1 wherein each relay of said plurality of relays provides at least one of: discrete control of said one or more cabin service elements of said plurality of cabin service elements; discrete control of said one or more passenger service units of said plurality of passenger service units; data communication between said one or more cabin service elements of said plurality of cabin service elements; and data communication between said one or more passenger service units of said plurality of passenger service units.

10. A control module unit of a cabin service system, said cabin service system comprising a cabin control panel, a pair of power rails, a plurality of passenger service units communicatively coupled to a plurality of passenger service elements associated with seat groups and a plurality of cabin service elements unassociated with said seat groups, said control module unit comprising:
a connector configured to mechanically and electrically couple said control module unit to said pair of power rails;
a plurality of communication ports comprising:
at least one infrared communication port;
at least one 10/100 Ethernet communication port;

at least one Controller Area Network communication port; and
at least one RS-485 communication port, and
wherein said plurality of communication ports is configured to communicatively interconnect said cabin control panel with said plurality of cabin service elements and said plurality of passenger service units; and
a plurality of relays communicatively coupled to each communication port of said plurality of communication ports; and wherein:
said control module unit is located separate from said cabin control panel, said plurality of passenger service units, and said plurality of cabin service elements;
said control module unit is removable from said pair of power rails by decoupling the control module unit from already existing electrical contacts in the power rails, and is movable relative to said pair of power rails to selectively locate said control module unit anywhere along said pair of power rails relative to any one of said cabin control panel, said plurality of passenger service units, and said plurality of cabin service elements by coupling the control module unit to already existing electrical contacts in the power rails without additional wires;
first ones of said plurality of relays of said control module unit are configured to be communicatively coupled to each of said plurality of passenger service units;
second ones of said plurality of relays of said control module unit are configured to be communicatively coupled to each of said plurality of cabin service elements;
said control module unit is configured to relay-passenger service control signals and passenger service data between said cabin control panel and corresponding ones of said plurality of passenger service units; and
said control module unit is configured to relay cabin service control signals and cabin service data between said cabin control panel and said plurality of cabin service units.

11. The control module unit of claim 10 comprising:
at least one electrical spring contact detachably connected to at least one power rail of said pair of power rails to provide electrical power said control module unit; and
at least one non-conductive spring clip detachably connected to said at least one power rail to provide mechanical attachment of said control module unit to said at least one power rail.

12. The control module unit of claim 10 wherein said pair of power rails is coupled to a simplified overhead electronics unit, wherein said simplified overhead electronics unit is coupled to a power source via a non-essential power bus and an essential power bus, and wherein said simplified overhead electronics unit provides a power output to said pair of power rails.

13. The control module unit of claim 12 comprising:
a first electrical circuit coupled to said pair of power rails and said simplified overhead electronics unit to provide power for operation of essential functions while electrically connected to said pair of power rails; and
a second electrical circuit coupled to said pair of power rails and said simplified overhead electronics unit to provide power for operation of non-essential functions while electrically connected to said pair of power rails, wherein said first electrical circuit and said second electrical circuit operate alternately based upon a polarity of said power output to said pair of power rails.

14. The control module unit of claim 10 wherein each communication port of said plurality of communication ports is communicatively coupled to and corresponds to one or more cabin service elements of said plurality of cabin service elements or one or more passenger service units of said plurality of passenger service units.

15. The control module unit of claim 10 wherein each relay of said plurality of relays provides at least one of: discrete control of said one or more cabin service elements of said plurality of cabin service elements; discrete control of said one or more passenger service units of said plurality of passenger service units; data communication between said one or more cabin service elements of said plurality of cabin service elements; and data communication between said one or more passenger service units of said plurality of passenger service units.

16. A method for manufacturing an aircraft, said method comprising:
installing a pair of power rails to a support structure of said aircraft;
installing a plurality of seat groups within said aircraft;
mechanically and electrically coupling a plurality of passenger service elements within said aircraft, wherein each one of said plurality of passenger service elements provides a passenger related service associated with at least one of said plurality of seat groups;
mechanically and electrically coupling a plurality of passenger service units to said pair of power rails;
communicatively coupling each one of said passenger service units to at least one passenger service element of said plurality of passenger service elements;
mechanically and electrically coupling a plurality of cabin service elements within said aircraft, wherein each one of said plurality of cabin service units provides a stand alone non-passenger related service unassociated with said plurality of seat groups;
mechanically and electrically coupling a control module unit to said pair of power rails at a location separate from said cabin control panel, said plurality of passenger service units, and said plurality of cabin service elements, wherein said control module unit comprises:
a plurality of communication ports comprising:
at least one infrared communication port;
at least one 10/100 Ethernet communication port;
at least one Controller Area Network communication port; and
at least one RS-485 communication port; and
a plurality of relays communicatively coupled to each communication port of said plurality of communication ports;
communicatively coupling first ones of said plurality of relays of said control module unit to each one of said plurality passenger service units;
communicatively coupling second ones of said plurality of relays of said control module unit to each one of said plurality of cabin service elements;
installing a cabin control panel within said aircraft, wherein said cabin control panel transmits and receives passenger service control signals, passenger service data, cabin service control signals, cabin service data;
communicatively coupling said control module unit to said control panel; and
with said control module unit serving as a common interface between said cabin control panel and said plurality of passenger service units, relaying said passenger service control signals and said passenger service data between said cabin control panel and said plurality of passenger service units; and with said control module unit serving as a common interface between said cabin control panel and said plurality of cabin service elements, relaying said cabin service control signals and said cabin service data between said cabin control panel and said plurality of cabin service elements; and wherein said control module unit is removable from said pair of power rails by decoupling the control module unit from already existing electrical contacts in the power rails, and is movable relative to said pair of power rails to selectively locate said control module unit anywhere along said pair of power rails relative to any one of said cabin control panel, said plurality of passenger service units, and said plurality of cabin service elements by coupling the control module unit to already existing electrical contacts in the power rails without additional wires.

17. The method of claim 16 wherein each communication port of said plurality of communication ports is communicatively coupled to and corresponds to one or more cabin service elements of said plurality of cabin service elements or one or more associated passenger service units of said plurality of passenger service units.

18. The method of claim 16, comprising:
coupling said pair of power rails to a simplified overhead electronics unit;
coupling said simplified overhead electronics unit to a power source via a non-essential power bus and an essential power bus, such that said simplified overhead electronics provides a power output to said pair of power rails;
coupling a first electrical circuit coupled to said pair of power rails and said simplified overhead electronics unit to provide power for operation of essential functions while electrically connected to said pair of power rails; and
coupling a second electrical circuit to said pair of power rails and said simplified overhead electronics unit to provide power for operation of non-essential functions while electrically connected to said power rails,
wherein said first electrical circuit and said second electrical circuit operate alternately based upon a polarity of said power output to said pair of power rails.

19. The method of claim 16 wherein said control module unit:
relays said passenger service control signals and said passenger service data from said cabin control panel to selected ones of said plurality of passenger service units;
relays said cabin service control signals and said cabin service data from said cabin control panel to selected ones of said plurality of cabin service elements;
relays said passenger service data from all of said plurality of passenger service units to said cabin control panel; and
relays said cabin service data from all of said plurality of cabin service elements to said cabin control panel.

20. The method of claim 16 wherein each relay of said plurality of relays provides at least one of: discrete control of said one or more cabin service elements of said plurality of cabin service elements; discrete control of said one or more passenger service units of said plurality of passenger service units; data communication between said one or more cabin service elements of said plurality of cabin service elements; and data communication between said one or more passenger service units of said plurality of passenger service units.

* * * * *